Figure 1:
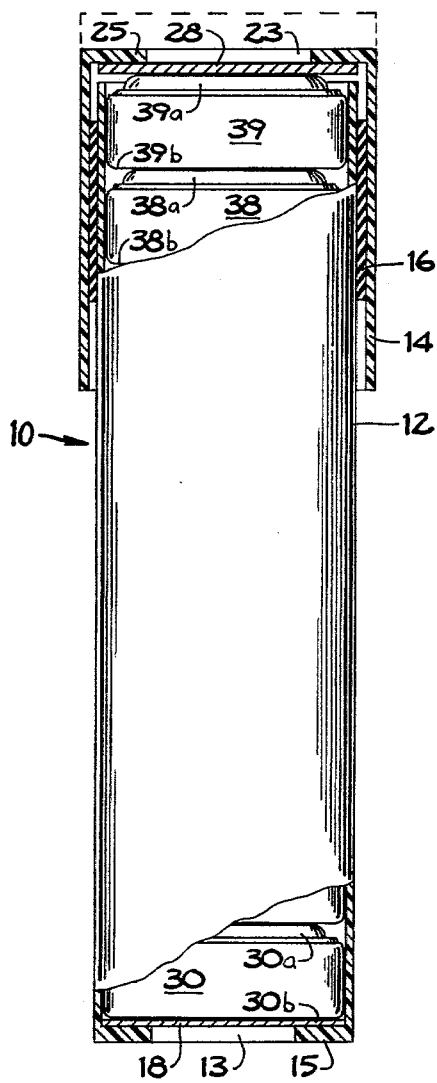

United States Patent [19]

Ciliberti, Jr. et al.

[11] 4,224,385
[45] Sep. 23, 1980

[54] EXPANDABLE BATTERY CASE

[75] Inventors: Frank L. Ciliberti, Jr., Ossining; Gordon E. Kaye, Garrison, both of N.Y.

[73] Assignee: P. R. Mallory & Co. Inc., Indianapolis, Ind.

[21] Appl. No.: 313

[22] Filed: Jan. 2, 1979

[51] Int. Cl.² .................... H01M 2/12; H01M 2/08
[52] U.S. Cl. ............................. 429/66; 429/157; 429/82
[58] Field of Search ............... 429/66, 153, 157, 82

[56] References Cited

U.S. PATENT DOCUMENTS

| | | | |
|---|---|---|---|
| 2,864,880 | 12/1958 | Kaye | 429/157 |
| 3,173,808 | 3/1965 | Himy et al. | 429/153 |
| 3,390,016 | 6/1968 | Nelson | 429/153 |
| 3,891,462 | 6/1975 | Langkau | 429/157 |

FOREIGN PATENT DOCUMENTS

| | | | |
|---|---|---|---|
| 872713 | 6/1942 | France | 429/157 |
| 555047 | 7/1943 | United Kingdom | 429/66 |

*Primary Examiner*—Donald L. Walton
*Attorney, Agent, or Firm*—Ronald S. Cornell; Israel Nissenbaum; Martin M. Glazer

[57] ABSTRACT

A battery case which expands to accommodate expansion of individual cells therein while maintaining structural integrity. The case comprises an open ended cell holder with a sleeve thereon covering the open end of said cell holder. The cell holder and the sleeve are adhered to each other by an elastomeric adhesive.

8 Claims, 2 Drawing Figures

U.S. Patent    Sep. 23, 1980    4,224,385

EXPANDABLE BATTERY CASE

This invention relates to cases for cells which are electrically interconnected and arranged therein for use as batteries and particularly to such cases containing generally flat cells which expand during discharge.

Cases for holding electrically interconnected cells in battery configuration generally enclose such cells arranged in a stacked formation. The cases are usually composed of an insulative plastic material to prevent intercell shorting and generally have a tubular shape to accommodate the widely prevalent cylindrical cells. The ends of the tubular cases are generally crimped over the outer edges of the end cells in the stack to fixedly retain the cells therein. Alternatively the ends of the tubes are sealed with the terminals of the batteries extending through the sealing materials for external electrical connection. Such cases rigidly hold the cells in proper position and orientation for efficient electrical output and connection in the form of a battery. However, when the enclosed cells expand during discharge, high pressures are generally exerted on either the crimps or the sealing materials with resultant crimp unfolding or seal rupture. Electrical connections may be broken and the cells may actually fall out of the cases thereby prematurely ending battery life. This problem is exacerbated when the cells are arranged in a column since the expansion of the cells is additive. Cells generally expand in the direction of least resistance and since individual cell seals are the weakest part of the cell container structure, expansion occurs in that direction. Battery configurations, particularly those requiring series intercell connections generally comprise cells with their seals longitudinally arranged. Expansion of the cells, as described, is therefore cumulative.

In larger batteries an expedient utilized to minimize the effects of cell expansion is the use of filler materials which have sufficient rigidity to maintain pressure on the cells to prevent movement but which "give" to a greater extent than either the crimp or the sealing materials, whereby the effects of the accumulated expansive pressures are dissipated. However, smaller batteries cannot include such filler materials without severe losses of volumetric capacity.

It is an object of the present invention to provide a structure for a battery case which maintains structural integrity even under cell expansion pressures.

It is a further object of the present invention to provide a structure for a battery case which expands upon cell expansion and which has a self locking feature to limit such expansion.

It is a still further object of the present invention to provide a structure for a battery case which may be utilized in small batteries without excessive volumetric capacity losses.

Figure 2:
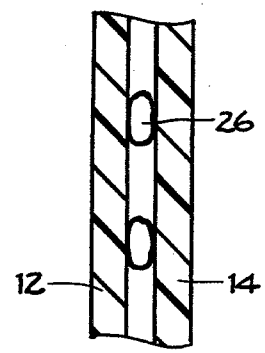

These and other objects, features and advantages of the present invention will be more evident from the following discussion and drawings in which:

FIG. 1 is a partially sectioned elevation view of the battery case of the present invention; and FIG. 2 is an enlarged view of a portion of a preferred embodiment of the battery case after expansion thereof.

Generally the present invention comprises a battery case comprising an open ended cell holder with a sleeve at an end thereof covering said open end. The cell holder and the sleeve are held in fixed relation to each other by an elastomeric adhesive between adjacent surfaces of the cell holder and the sleeve. During initial discharge and expansion of the cells, in the battery case, the sleeve and the cell holder move apart with the elastomeric adhesive stretching to accommodate movement without significant loss of mechanical integrity. As expansion and movement progresses, towards the end of discharge, portions of the elastomeric adhesive may peel from the surface of either or both the sleeve and the cell holder. It is therefore preferred that the elastomeric adhesive be capable of breaking into small cracked areas and rolling into beads as a result of the sliding action between the surfaces of the cell holder and the sleeve. The beads, as they are enlarged, subsequently provide a frictional drag between the cell holder and the sleeve thereby maintaining further mechanical integrity. Eventually the enlarged beads lock the cell holder and the sleeve together by binding and jamming action thereby preventing complete separation of the cell holder and the sleeve. It is understood that for expansion of the battery case to be properly effected as above described there should be substantially free movement of the cell holder and the sleeve absent the elastomeric adhesive.

With reference to the drawings, FIG. 1 depicts a battery case 10, comprising cell holder 12 and sleeve 14, containing flat cylindrical button cells 30-39 (cells 31-37 not shown) in a stacked column formation. As shown, the cells are arranged in series with the button ends 30a-39a of the cells 30-39 respectively being of one polarity and the cell cans 30b-39b being of the other polarity. At either end of the stacked cells are metallic contact plates 18 and 28 welded to stack end cells 30 and 39 respectively with the metallic plates being electrically contacted through apertures 13 and 23 to provide electrical connection to a battery powered device. Open ended cylindrical cell holder 12 encloses and holds cells 30-39 in proper mechanical and electrical orientation. Cylindrical sleeve 14 covers the open end of the cell holder 12 and exerts a mechanical pressure on cells 30-39 for good mechanical and electrical interconnection between the cells. Elastomeric adhesive 16 between cell holder 12 and sleeve 14 holds the cell holder and the sleeve in fixed relation with one another whereby the end covering sleeve may exert the requisite pressure on cells 30-39 and properly contain them as a battery. In order to maintain case integrity during cell discharge and expansion the end walls 15 and 25 of cell holder 12 and sleeve 14 respectively are thicker than the sidewalls of the cell holder and the sleeve. Stress forces engendered by cell expansion are therefore concentrated at the relatively weaker adhesive bonded sites. During cell and battery expansion resulting from cell discharge and as indicated by the dotted lines the elastomeric adhesive 16 stretches to accommodate the movement. Towards the end of cell and battery discharge the adhesive may separate from the cell holder and sleeve surfaces. It is therefore preferred that the adhesive thereafter form beads 26 between adjacent surfaces of the cell holder 12 and sleeve 14 as shown in FIG. 2. Further movement of the sleeve increases the size of the beads thereby causing the sleeve and the cell holder to frictionally lock together before complete separation. Elastomeric adhesives capable of forming such locking beads include room temperature vulcanizing silicone rubbers (RTV) and are accordingly preferred. Additionally silicone rubbers are extremely stable under varying conditions.

When spring contacts are utilized for use in conjunction with the battery terminals at the ends of the battery, improved contact results from the expansion of the battery case if case integrity is maintained.

Cells which have a tendency to expand under discharge include those containing zinc/mercury oxide and zinc/manganese dioxide cell couples and generally other cells subject to gas formation. During discharge the sealed end walls of the cells tend to bow outwardly because of the increased volume of cell reaction products and gases engendered therein by the cell discharge.

The cell holder and the sleeve therefor are generally constructed of insulative plastics having a degree of rigidity for fixedly retaining the cells. Typical examples of such plastics include ABS, polycarbonate, nylon, polystyrene and the like.

The elastomeric adhesive is generally an adhesive which has a degree of flexibility or "give" whereby it may be stretched to some extent without rupture in contrast to rigid adhesives. Preferably the elastomeric adhesive should be able to mass unto itself with the formation of beads, as described above, in order to prevent separation of the cell holder and the sleeve.

Elastomeric adhesives in addition to the aforementioned RTV include natural rubber, reclaimed rubber, neoprene, nitrile, urethane, styrene butadiene and polysulfides.

The elastomeric adhesive may be applied to the adjacent surfaces of either or both the cell holder and the sleeve as a continuous coating, or in the form of stripes, dots etc. whereby a holding bond may be formed thereby. Preferably the elastomeric adhesive is applied initially to the surface of the cell holder adjacent to the open end thereof. The application is in the form of dabs or dots generally symmetrically disposed around the cell holder. Upon positioning of the sleeve onto the cell holder, the dabs or dots streak to substantially span the length of the adjacent surfaces of the cell holder and the sleeve. After the application, the adhesive is cured or set as required to form the requisite elastic or flexible bond.

The utilization of the elastomeric adhesive in the form of spaced dots, streaks or other substantially non continuous coatings has particular application with respect to batteries containing cells such as lithium/sulfur dioxide cells which vent gases when abused. Though such cells do not normally expand during discharge the venting thereof, under adverse conditions, has generally the same effect. The expansion of the battery case, allowed by the elastomeric adhesive, acts as a buffer in preventing the cell holder and sleeve from blowing apart under the initial venting pressure. After the buffering battery case movement, the vented gases are released to the atmosphere via the open spaces between the dots and streaks etc. of the elastomeric adhesive.

It is understood that changes and variations in structure components and the like may be made without departing from the scope of the present invention as defined in the following claims.

What is claimed is:

1. A battery case, for containing two or more sealed electrochemical cells subject to expansion or gas venting, said case being adapted to expand to compensate for said cell expansion or gas venting with said case comprising an open ended rigid holder for said cells, an outer overlapping rigid sleeve for said holder, with a first portion of said sleeve covering the open end of said holder and a second portion of said sleeve over-lapping and spaced from an outer surface of said holder whereby said cells are retained within said holder, and means for adhering said holder and said sleeve with said means permitting relative movement between said holder and said sleeve, said means consisting essentially of an elastomeric adhesive between said outer surface of said holder and said second overlapping portion of said sleeve, with said holder and said sleeve being elastically adhered to each other by said adhesive to an extent whereby upon cell expansion or gas venting said rigid holder and said rigid sleeve move apart to compensate for said expansion or venting with said elastomeric adhesive stretching to maintain adhesion between said holder and said sleeve.

2. The battery case of claim 1 wherein said elastomeric adhesive forms beads when positioned between two sliding surfaces.

3. The battery case of claim 1 wherein said elastomeric adhesive is selected from the group consisting of room temperature vulcanizing silicone rubber (RTV), natural rubber, reclaimed rubber, neoprene, nitrile, urethane, styrene butadiene and polysulfides.

4. The battery case of claim 3 wherein said elastomeric adhesive is RTV.

5. The battery case of claim 1 wherein said holder and said sleeve each comprise a tube having one open end and a second partially open end, adapted to permit external electrical connection through said partially open ends to cells contained within said case, and wherein said cells are retained within said case by said partially open ends, said sleeve tube having a larger diameter than said holder tube such that the open end of said holder tube substantially freely fits within the open end of said sleeve tube and wherein said elastomeric adhesive adheres the adjacent inner wall of said sleeve tube and the outer wal of said holder tube to each other.

6. A battery comprising two or more electrically interconnected sealed electrochemical cells contained within the battery case of claim 1.

7. A battery comprising two or more electrically interconnected electrochemical cells contained within a battery case with said cells being subject to gas venting and said case being adapted to expand to compensate for said gas venting with said case comprising an open ended holder for said cells, an outer sleeve for said holder, with a portion of said sleeve covering the open end of said holder whereby said cells are retained within said holder, and an elastomeric adhesive between adjacent surfaces of said holder and said sleeve, with said holder and said sleeve being adhered to each other by said adhesive and wherein said elastomeric adhesive is substantially non-continuous whereby said gas may be released to the atmosphere without separation of said cell holder and said sleeve.

8. The battery of claim 7 wherein said cells comprise lithium/sulfur dioxide cells.

* * * * *